United States Patent [19]
Hashimoto

[11] Patent Number: 5,710,828
[45] Date of Patent: Jan. 20, 1998

[54] METHOD AND APPARATUS FOR CONVERTING A THRESHOLD MATRIX WHICH IS THEN USED TO BINARIZE IMAGE SIGNALS

[75] Inventor: Michinori Hashimoto, Ayase, Japan

[73] Assignee: Fuji Photo Film Co., Ltd., Kanagawa, Japan

[21] Appl. No.: 413,849

[22] Filed: Mar. 30, 1995

[51] Int. Cl.$^6$ .................................................... G06K 9/38
[52] U.S. Cl. ........................ 382/172; 382/273; 358/466
[58] Field of Search ............................. 382/172, 270, 382/273; 358/457, 465, 466, 460

[56] References Cited

U.S. PATENT DOCUMENTS

| | | | |
|---|---|---|---|
| 4,710,822 | 12/1987 | Matsunawa | 382/172 |
| 4,758,897 | 7/1988 | Hiratsuka et al. | 358/457 |
| 5,046,118 | 9/1991 | Ajewole et al. | 382/169 |
| 5,075,872 | 12/1991 | Kumagai | 382/172 |
| 5,125,045 | 6/1992 | Murakami et al. | 382/270 |
| 5,201,013 | 4/1993 | Kumagai | 358/457 |
| 5,268,771 | 12/1993 | Murakami et al. | 358/457 |
| 5,315,669 | 5/1994 | Kumagai | 358/457 |
| 5,337,373 | 8/1994 | Marandici et al. | 382/172 |
| 5,351,313 | 9/1994 | Bessho et al. | 382/172 |
| 5,438,634 | 8/1995 | Kumagai | 358/457 |
| 5,469,515 | 11/1995 | Lin | 382/237 |
| 5,502,776 | 3/1996 | Manabe | 382/172 |

*Primary Examiner*—Leo Boudreau
*Assistant Examiner*—Chris Kelley
*Attorney, Agent, or Firm*—Sughrue, Mion, Zinn, Macpeak & Seas, PLLC

[57] ABSTRACT

An image processing method that employs a threshold matrix to binarize image signals obtained by reading an image recorded on a film such as microfilm. A middle tone image brightness range, which corresponds to a middle or half tone image, is discriminated by referring a brightness histogram for image signals. The upper- and lower-most brightness values of the middle tone image brightness range are used to convert the elements of a threshold matrix in accordance with a predetermined conversion expression, and the converted threshold matrix used for binarization processing. Even if a film density variation occurs or if there is a background density change, binary conversion (a dithering process) can be performed, without deterioration of image quality, within a middle tone density area of, for example, a photograph.

17 Claims, 9 Drawing Sheets

METHOD AND APPARATUS FOR CONVERTING A THRESHOLD MATRIX WHICH IS THEN USED TO BINARIZE IMAGE SIGNALS

BACKGROUND OF THE INVENTION

1. Field of the Invention

The present invention relates to an image processing method and an image processing apparatus for performing bi-level quantization or binarization on an image signal obtained by reading or scanning an image that is recorded or scanning on a photofilm.

2. Prior Art Statement

There is proposed in the art an image processing method, in which a projection image of a microfilm are read with an image sensor, such as a CCD line sensor, to obtain image signals having multiple gray scale levels (e.g., 256 gray scale or tone levels). The image signals are used to perform image processing, and the resultant image is then displayed on a CRT or a liquid crystal display device, stored on an optical disk, output to a printer, or transferred to a remote external device.

A dithering method (one example is disclosed in Japanese Unexamined Patent Publication No. 126875/1989) is widely employed for image processing when an image to be read is an image including a middle or half tone density area such as a photograph.

FIG. 9 is a conceptual diagram of a conventional dithering method. In this method, a conventional binarizer 2 employs a threshold matrix M to binarize an image signal V (which can be either a digital or an analog signal) and outputs a binarized image signal (a dithered output) a. The elements of the matrix M are either random numbers or pseudorandom numbers for binarizing or thresholding the image signal. A Bayer type 4×4 or 8×8 matrix, for example, can be employed.

A Bayer type matrix, however, is not always the best choice for the threshold matrix (a so-called dithering matrix) as used in the dithering method, as it sometimes does not provide optimal image qualities for some image types. In particular, the conventional dithering method has a disadvantage such that it has a narrow dynamic range.

As the average density of image recorded on photofilm differs from film to film and varies widely. The density distribution is dependent on the film as used. With a high density film, for example, the density distribution for the entire image is inclined toward the high density side, while with low density film, the density distribution is inclined toward the low density side. And of course, the qualities of negative film and positive film may be mixed. When, as in this case, the density distribution fluctuates greatly, the employment of the conventional dithering method results in the appearance of more blank areas and black dots, and drastic deterioration of the image quality.

OBJECTS AND SUMMARY OF THE INVENTION

To overcome these shortcomings, it is one object of the present invention to provide an image processing method that can perform the binarization of the image signals without any deterioration of the image quality in a middle or half tone density area such as a photograph even if the film density distribution is changed.

It is another object of the present invention to provide an image processing apparatus that can perform the above described image processing.

The object of the present invention is achieved by the provision of an image processing method, for employing a threshold matrix to binarize image signals obtained by reading an image recorded on a film, comprising the steps of:

a) preparing a histogram that represents the number of pixels in relation to an intensity or brightness level of said image signals;

b) discriminating a middle tone image brightness range corresponding a middle tone image;

c) converting individual elements of a reference threshold matrix by using an uppermost and lowermost brightness values of said middle tone image brightness range to obtain a converted threshold matrix; and d) binarizing said image signals by said converted threshold matrix.

Another object of the present invention is achieved by the provision of an image processing apparatus, which employs a threshold matrix to binarize image signals obtained by reading an image recorded on a film, comprising:

a) histogram preparation means for preparing a histogram that represents the number of pixels in relation to a intensity or brightness level of said image signals;

b) a discriminator for discriminating a middle tone image brightness range including brightness levels corresponding to a meddle tone image;

c) a matrix converter for converting individual elements of a reference threshold matrix by using an uppermost and lowermost brightness values for said middle tone image brightness range to obtain a converted threshold matrix; and d) a binarizer for binarizing said image signals by said converted threshold matrix.

In the present invention, a so-called dithering matrix can be employed as a threshold matrix. However another type of matrix also may be employed. In this specification, a brightness value or level is equivalent to the intensity of an image signal that is output for a read-out image, and therefore a middle tone (image) brightness range corresponds to a film density range that represents a middle or half tone image region in a film. The brightness range for a middle tone image can be calculated as follows. A middle brightness range is delimited by excluding predetermined ranges in a histogram both on the high brightness side and on the low brightness side, and by then excluding from the middle brightness range a certain range including a peak that corresponds to the background of a document image, a middle tone image brightness range is acquired.

If the film that is being used is a negative film, the background brightness of an image (e.g., a document recorded on the film) is positioned nearer the low brightness, small gray scale side (dark gray scale), and a lowermost brightness is determined so as to exclude the peak in the histogram that is due to the background of the document and is positioned at the lower brightness side. If the film that is being used is a positive photofilm, the background brightness of a document is positioned nearer the high brightness, large gray scale side (light gray scale), and an upper brightness range limit is determined in order to exclude the peak in the histogram due to the background brightness of the document and is positioned at higher brightness side.

The middle brightness range is determined by removing, for example, 5% of the data contained in the the high brightness side and 5% of the data contained in from the low brightness side from the total data in the histogram. A certain range to be removed from the middle brightness range, i.e., a constant range including a peak which is corresponds to the background brightness of a document, can be regarded as the predetermined number of data (S×3/20, for example, wherein the the number of total data is represented by S) on the peak side in the middle brightness range.

The individual elements $A_{pq}$ of a converted threshold matrix that is employed in the present invention can be determined by the following expression:

$$A_{pq}=a_{pq}(U-L)/X+L$$

wherein $A_{pq}$: individual element of the conveted threshold matrix;

$a_{pq}$: individual element of a reference threshold matrix;

U: uppermost brightness value of a middle tone image brightness range;

L: lowermost brightness value of a middle tone image brightness range; and

X: value that is greater than (U−L) and smaller than N, where N is a gray scale level that is read for the image, when the film that is being used is a negative film.

As negative film and positive film differ in photosensitivity and development characteristics, the density distributions for middle tone images contained in the two films are different with each other. Generally, negative films have relatively a narrow middle tone image brightness range corresponding to a middle tone image, while positive films have relatively a wider middle tone image brightness range corresponding to a middle tone image. For negative films, the individual elements $a_{pq}$ of a reference threshold matrix are multiplied by (U−L)/X which represents a value set a value smaller than "1", and the differences between the respective elements of the threshold matrix are decreased. While for positive films, the individual elements $a_{pq}$ of the reference threshold matrix are multiplied by (U−L)/X which represents a value set as a value greater than "1", so that differences between the elements of the threshold matrix are increased.

Further, since the lowermost brightness value L of the middle tone image brightness range is added to the individual elements of the threshold matrix, a threshold matrix can be provided which aims at the middle tone image brightness range for more detailed or fine binary conversion.

When an image is read while using N=256 gray scale levels, it is preferable that X=148. In other words, the individual elements $A_{pq}$ of the converted threshold matrix can be determined by the following expression:

$$A_{pq}=a_{pq}(U-L)/148+L$$

Generally, with the 256 gray scale, $$U-L<148$$

for the negative film, and $$U-L>148$$

for the positive film. Once the coefficient X is set equal to 148, any images read from either negative or positive film can be processed by the present image procesing method. The value for the coefficient X, however, is not limited to 148, and varies in dependence on the film type and the characteristics of a line sensor used for image reading. By taking all of this into account, a desirable value can be selected, and the total structure of the expression for acquiring $A_{pq}$ may be altered.

In addition, the reference threshold matrix is not limited to a matrix of the Bayer type.

The present invention can be employed to process images in various types of films, such as microfilms, films for printing, and x-ray films for medical use. The present invention is especially effective for processing images in a film for which the density (or the brightness) of the background of a document varies mainly due to exposure conditions and development conditions. The images in films are not only those that are enlarged by a projection lens and read out, but also those that are read by closely attaching an image read means, such as a CCD image sensor, to a film.

The film that is employed may be either monochrome or color. In a case that a color film image is processed, the color of the read image is divided by a filter into monochrome tones, the image can be processed in the same manner as is one that is in monochrome film.

BRIEF DESCRIPTION OF THE DRAWINGS

FIG. 1 is a perspective view illustrating a microfilm reader according to a first embodiment of the present invention;

DETAILED DESCRIPTION OF THE PREFERRED EMBODIMENTS

Figure 9:
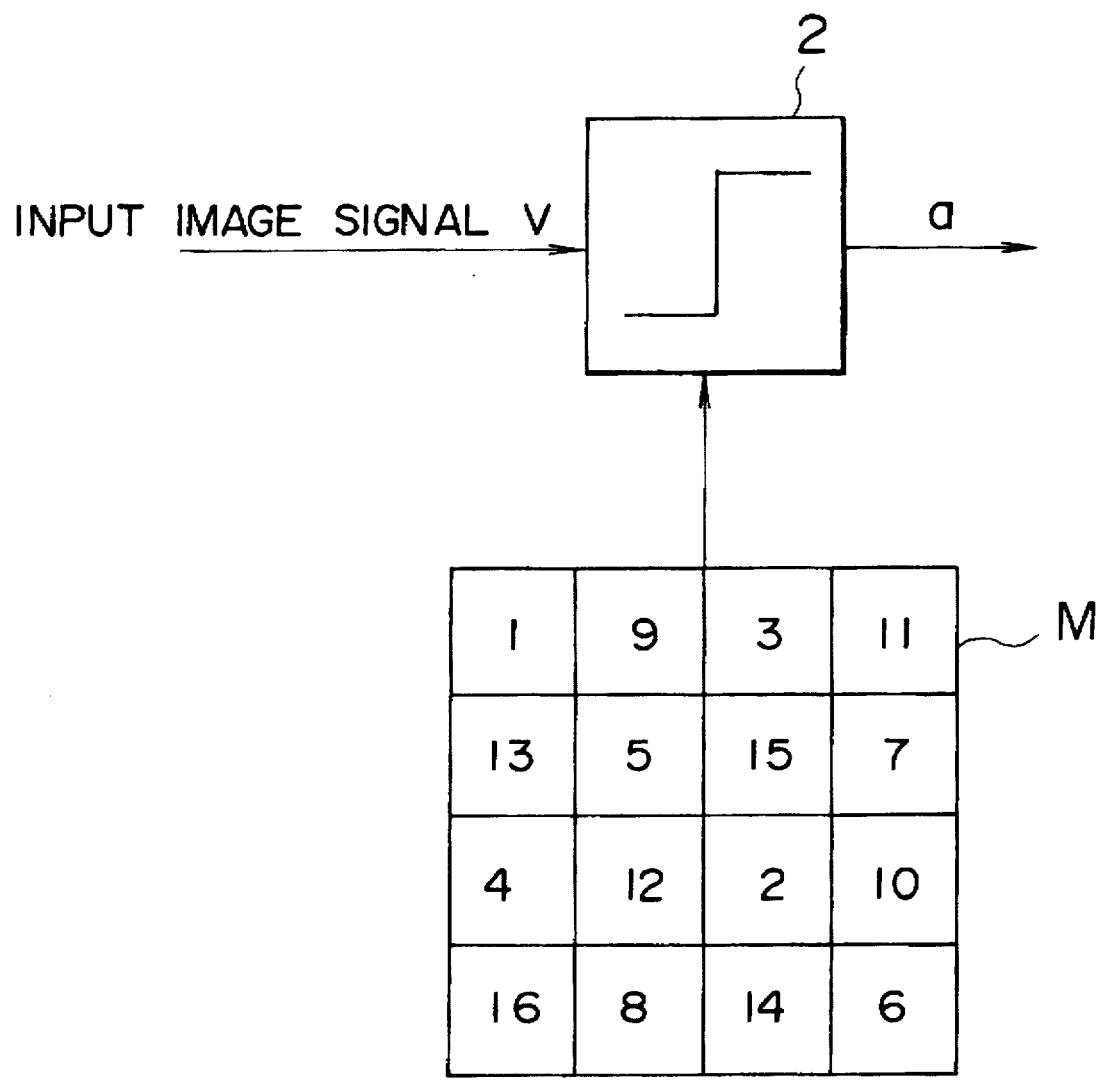
FIG. 9 is a conceptual diagram for a conventional dither processing.
Figure 2:
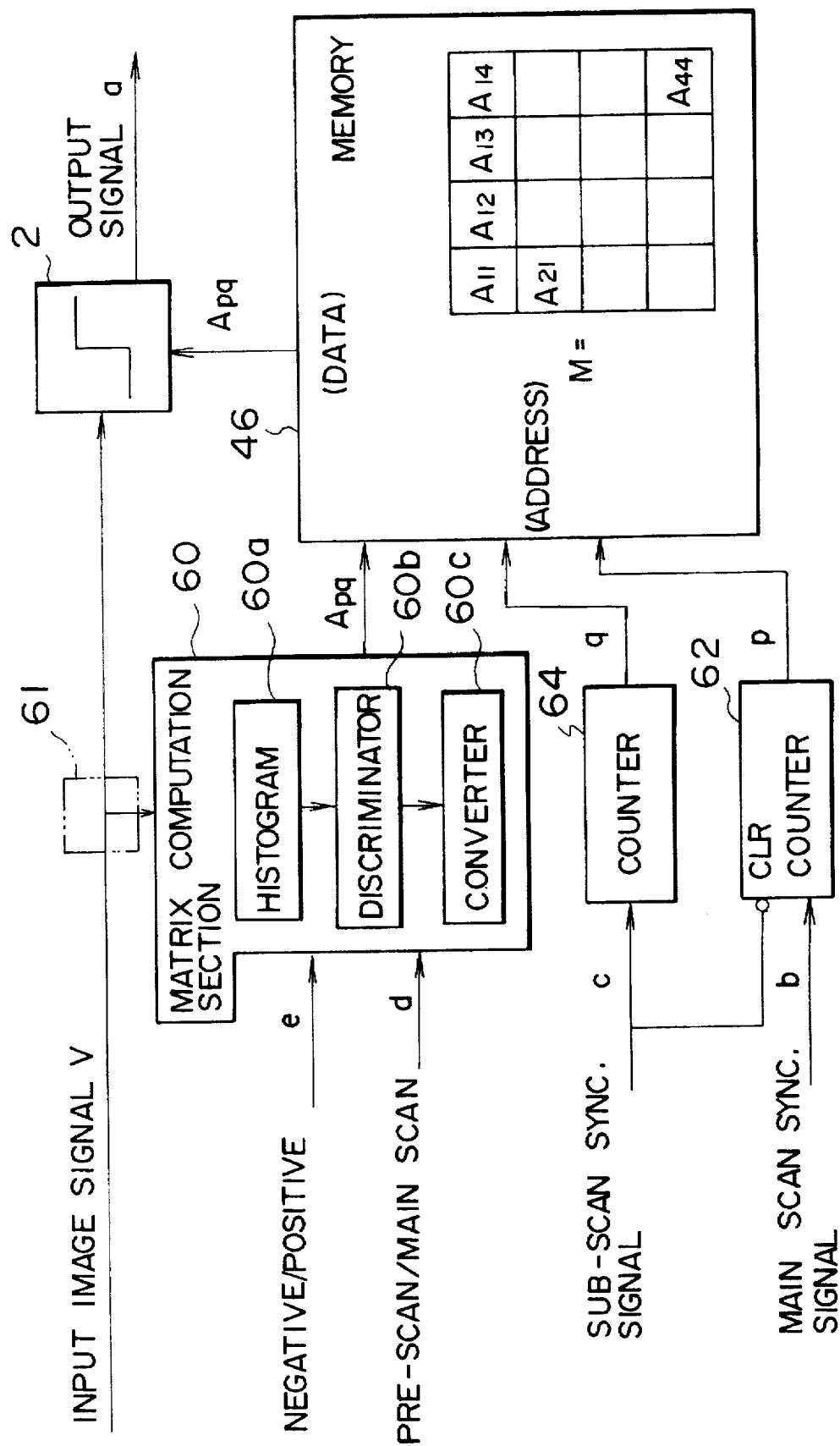
FIG. 2 is a conceptual diagram for binary conversion processing of the present invention.
Figure 3:
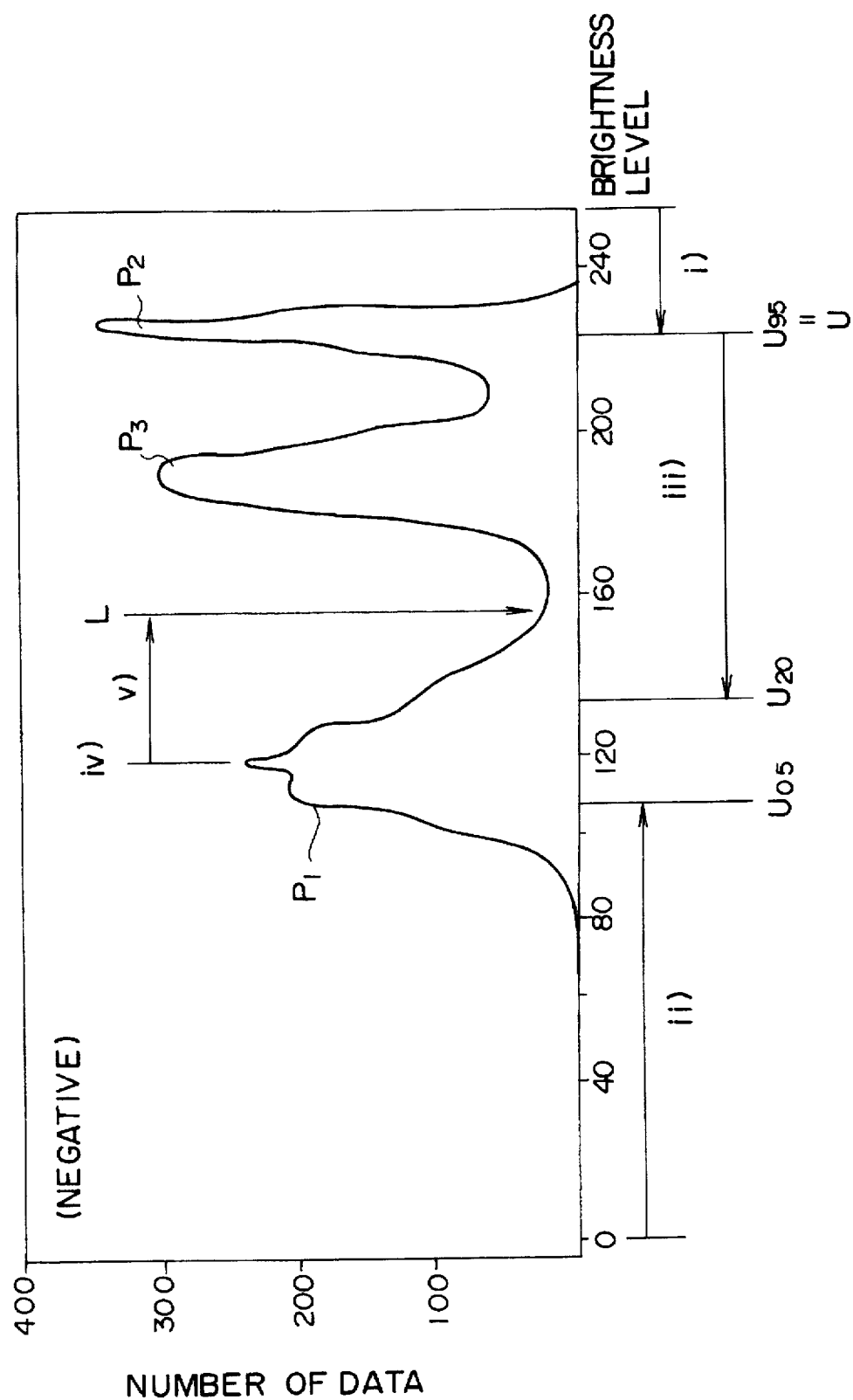
FIG. 3 is an example of a brightness histogram for a negative microfilm.
Figure 4:
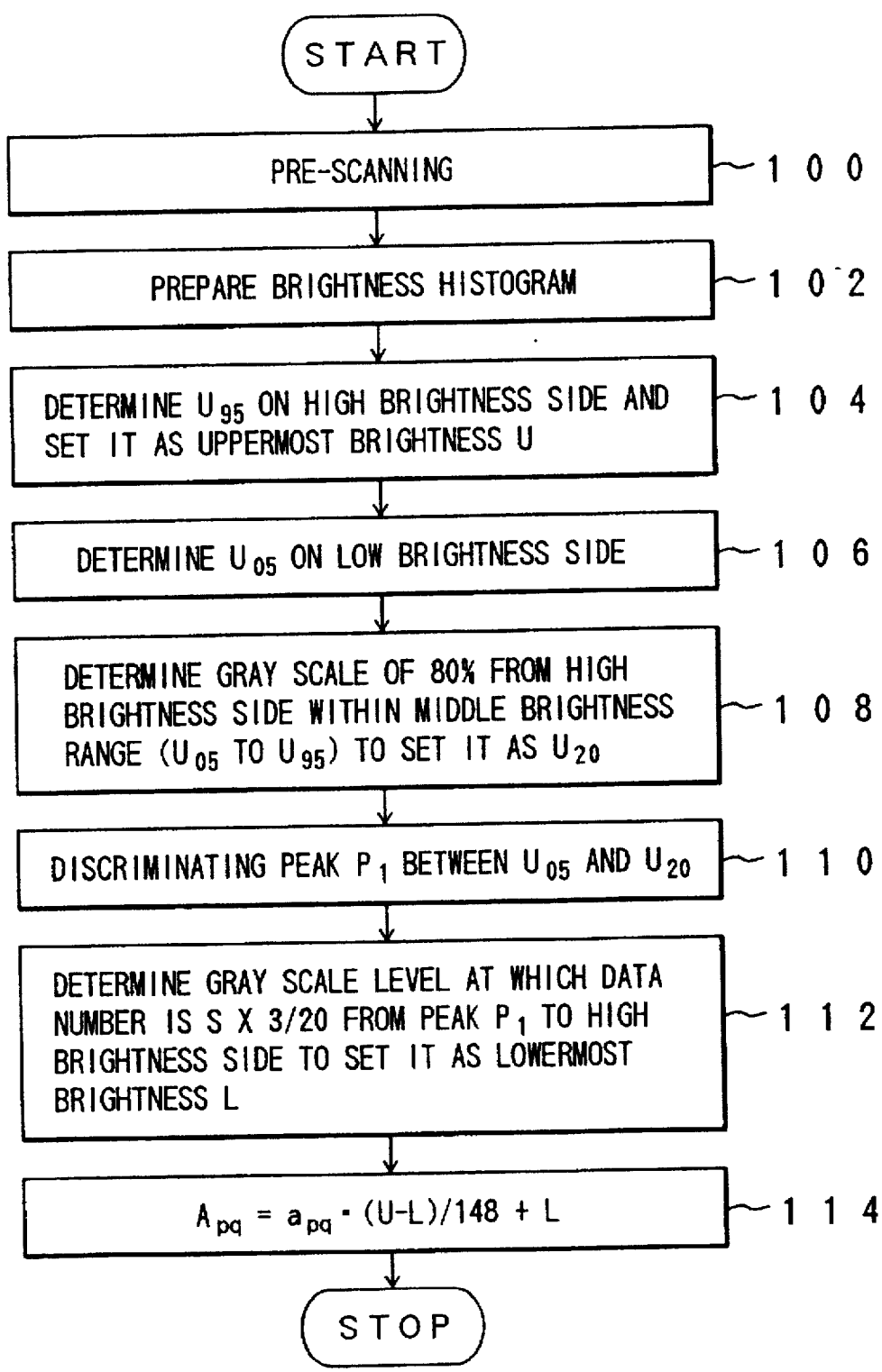
FIG. 4 is a flow chart of the computation processing to discriminate an uppermost and a lowermost brightness values of the middle tone image brightness range by referring to the histogram in FIG. 3 and to abtain a converted threshold matrix for the negative microfilm.
Figure 5:
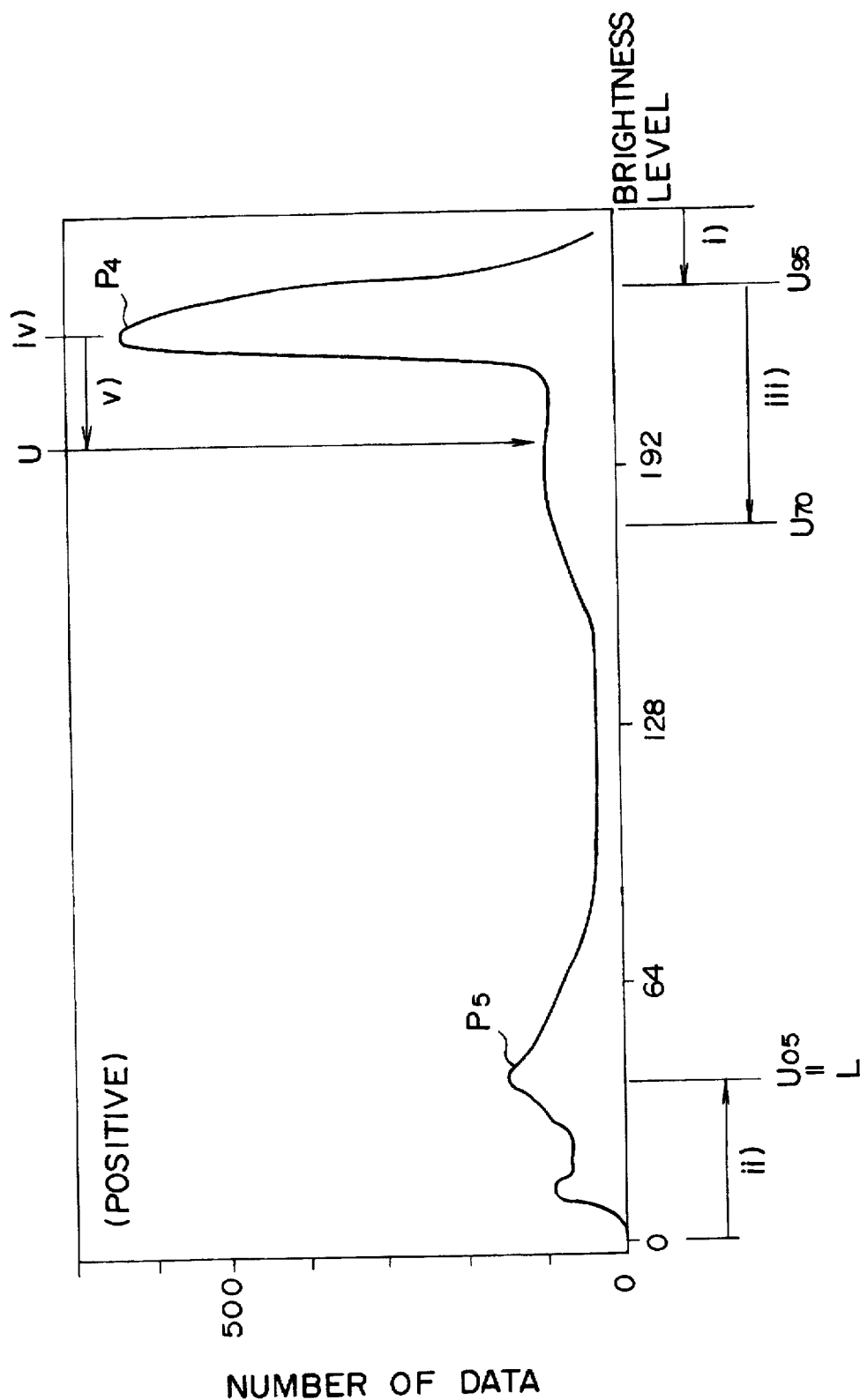
FIG. 5 is an example of a brightness histogram for a positive microfilm.
Figure 6:
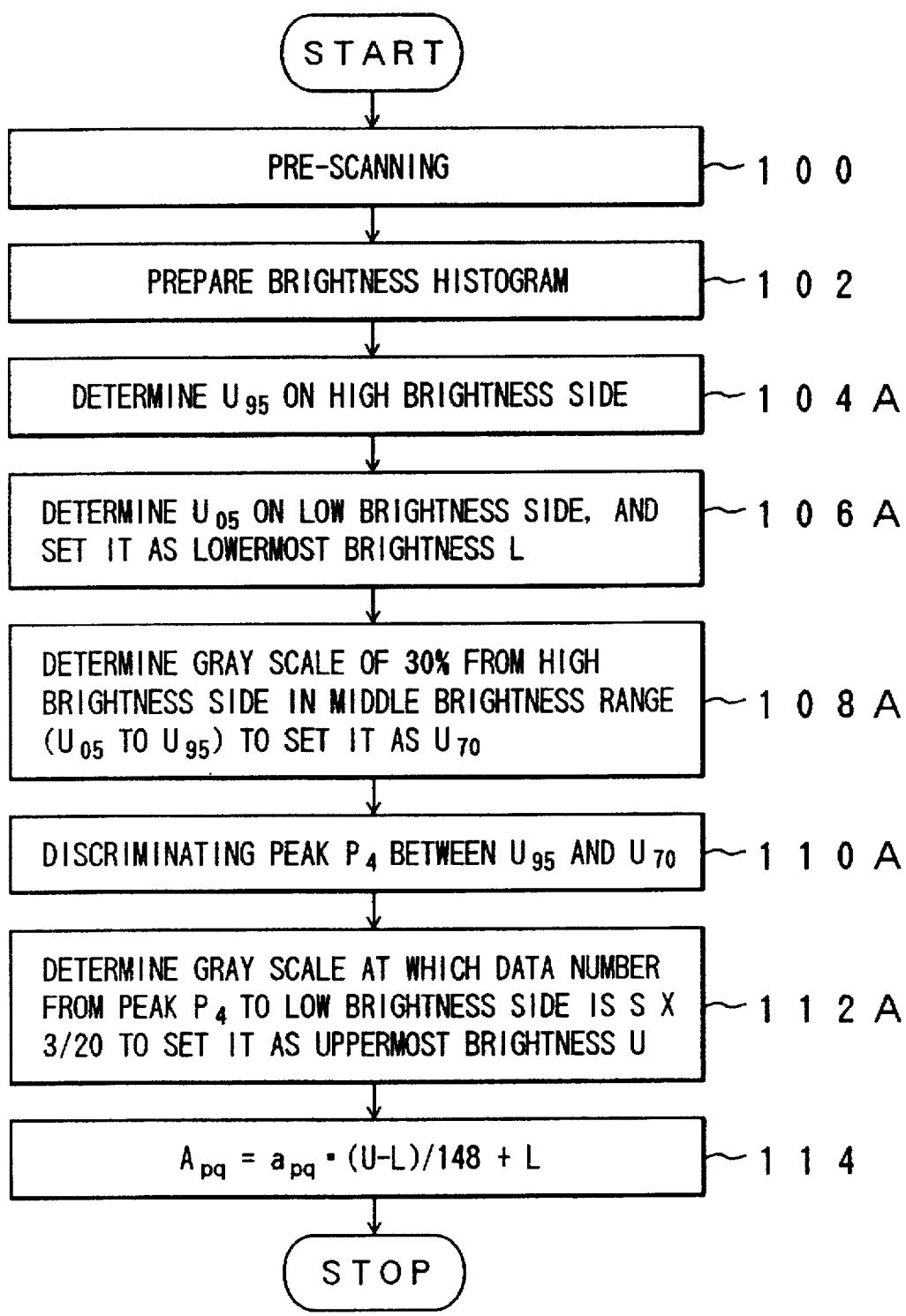
FIG. 6 is a flowchart of the computation processing to discriminate an uppermost and a lowermost brightness value by referring to the histogram in FIG. 5 and to obtain a converted threshold matrix for the positive microfilm.

FIG. 1 is a diagram illustrating a first embodiment of the present invention. In this embodiment, an image recorded or photographed on a microfilm is to be read. FIG. 2 is a block diagram illustrating a binarizing circuit used in the first embodiment; FIG. 3 is an example of a brightness histogram, for a negative microfilm: FIG. 4 is a flowchart showing the computation processing to obtain a converted threshold matrix by referring the histogram of FIG. 3; FIG. 5 is an example of a histogram for a positive microfilm; and FIG. 6 is a flowchart showing the computation processing to obtain a converted threshold matrix by referring the histogram of FIG. 5.

In FIG. 1, the light emitted by a light source 10 is guided through a capacitor lens 12, a heat-protective glass 14, a cold mirror 16, a microfilm 18, a projection lens 20, an image rotating prism 22, and mirrors 24, 26, 28 to a translucent screen 30 from its backside, and an enlarged image of the one that is in the microfilm 18 is focused and projected on the screen 30.

A CCD line sensor 32 that is provided at the rear side of the screen 30 can be shifted from side to side. More specifically, the line sensor 32 is extending in the vertical direction along with the screen 30. he line sensor 32 performs the main scanning by reading an image in its longitudinal direction (the main scanning direction) and sequentially outputting image signals as time series signals. The line sensor 32 performs the sub-scan while it is being shifted to the right or to the left by a motor 34.

The microfilm 18 is supplied from a supply reel 36 retained in a cartridge, and is wound around a wind-up reel 38. The microfilm 18, which is guided between the reels 36 and 38 by guide rollers 40 and 42, is fed horizontally below the projection lens 20.

An image signal processor 43 performs a predetermined process on an image signal V, which is the output of the line sensor 32. After the image signal processor 43 performs signal pro-processing, such as correcting for fluctuations in image signals for individual pixels of the projected image sensed by the line sensor 32, the processor 43 outputs the resultant signals to a controller 44 through a bandpass filter, a rectifying circuit, an integrating circuit, an A/D converter, and an output interface. A memory 46 stores an operating program for a CPU incorporated in the controller 44, and data for driving the prism 22 and the lens 20.

In this embodiment, the prism 22 is rotated by the motor 48 to adjust or correct the inclination of the projected image. In details, the motor 48 actuates a toothed timing belt 50, a small gear 52, etc., to rotate the prism 22. The motor 48 may be a stepping motor or a servo motor and is so designed that it can detect a rotation angle.

The controller 44 comprises a binarizing circuit, which is shown in FIG. 2. In FIG. 2, a matrix computation section 60, which is constituted by a CPU, includes histogram preparation means 60a which prepares a histogram showing the distribution of the number of the pixels of the signal intensity i.e., brightness value or level of an image signal; a discriminator 60b for discriminating a middle tone image brightness range, which includes brightness values corresponding a middle tone image by referring the histogram; and a matrix converter 60c for converting or altering the individual elements of a reference threshold matrix to that of a converted threshold matrix by using the uppermost and lowermost brightness values in the middle tone image brightness range.

The matrix computation section 60 computes an appropriate threshold matrix for a read-out image in compliance with whether the film 18 is negative or positive, by following the procedures shown in FIGS. 4 or 6. The procedures will be described hereinafter. The individual elements $A_{pq}$ of the converted threshold matrix M are stored in the memory 46.

If the acquired threshold matrix M consists of m columns by m rows, the values of the elements $A_{pq}$ of the matrix M that are to be read from the memory 46 are designated by addresses that are output by counters 62 and 64. The counter 62 counts sync signals b in the main scanning direction of an image reading device such as a line sensor, a two-dimensional image sensor, or a phototransistor array. When the count value p of the address counter 62 has reached m, the counter 62 is reset, and restarts the count at 0. The counter 64 counts synchronisation signal c in the sub-scannig direction in the same manner, and when the count value q of the counter 64 has reached m, the counter 64 restarts the count at 0. The counter 62 is reset by the sub-scan signal c.

The count values p and q of the counters 62 and 64 respectively designate a row address and a column address of the matrix M stored in the memory 46, and the value of an element $A_{pq}$ at a thus specified address is output from the memory 46 to the binarizer 2. In a case that the matrix M as shown in FIG. 2 is stored in the memory 46, when the value held by the counter 62 is 1 and the value held by the counter 64 is 1, i.e., (1, 1), $A_{1\ 1}$ is read out. Similarly, if the two values are (2, 1), $A_{2\ 1}$ is read out; if they are (3, 2), $A_{3\ 2}$ is read out; and if they are (4, 4), $A_{4\ 4}$ is read out.

The computation procedures performed by the matrix computation section 60 will now be explained. Image signal data for the predetermined number of pixels (e.g., 7000), which are obtained by the first scanning (pre-scanning), are employed for this computation. If data for all the pixels on a full screen were to be used to make a density or brightness histogram, the data volume would be so large that the processing would require a great amount of time. The matrix computation is therefore performed by employing a minimum data volume enough to discriminate the middle tone image brightness range.

The data as used are preferably pixel data that are obtained by a uniform sampling of a full image that is projected on the screen 30. For example, imaginary grids in which the number of the intersecting points is equal to the predetermined or desired number of data (about 7000) are overlaid on an area of a projected image, and by changing the intervals in the grids to make the entire image area covered by these grids, sampling can be uniformly performed across the entire image area. The projected image area can be determined by detecting during the pre-scanning a black frame region surrounding an image region.

Upon receipt of a signal d indicating the pre-scanning, the matrix computation section 60, in the above described manner, reads an amount of data that is equivalent to the required number of samples (step 100 in FIGS. 4 and 6). Thereafter, the histogram preparation means 60a prepares a brightness histogram (step 102). In the histograms that are shown in FIGS. 3 and 5, the characteristics of the patterns differ greatly when an image in a negative film is projected and read out, and when an image in a positive film is projected and read out.

Therefore, when an identification signal e that indicates whether a film is a negative film or a positive film is received by the matrix computation section 60, thereafter, the threshold matrix computation section 60 performs the computations required for preparation of a matrix by following the procedures in FIG. 4 for negative film and by following the procedures in FIG. 6 for positive film. The signal e may be manually input by an operator, or may be automatically input by a photosensor or the like to read an identification mark on a cartridge in which a microfilm is loaded.

In the histogram for the negative film, as shown in FIG. 3, the brightness of the projected image is read using 256 gray scale or tone levels. Peak $P_1$, which corresponds to the brightness of the background of a document image (the portions of a document that have the highest reflectance upon exposure and that corresponds to dark areas in the negative film), appears on the small or lower gray scale side. Peak $P_1$ appears due to noise, etc. (character portions of the document, and smudges, noise, etc., that correspond to transparent areas in the negative film) on the large or high gray scale side. Between peaks $P_1$ and $P_2$ appears a peak $P_3$ for a middle or half tone image that corresponds to a photograph, a picture, etc.

Using this histogram, the discriminator 60b determines a middle tone image brightness range within which a middle tone image is included. First, $U_{95}$ is determined to be the gray scale level at which the count value obtained by counting the number of the data from the large gray scale side (a high density portion on the document or a bright portion in the negative film) is equivalent to 5% of the number S of total data. This gray scale level $U_{95}$ is regarded or set as an uppermost brightness value U for the middle tone image brightness range (step 104, procedure i) in FIG. 3). Then, $U_{05}$ is determined as the gray scale level at which the count value obtained by counting the number of data items from the small gray scale side (a low density portion of the document or a dark portion in the negative film) is equivalent to 5% of the total number S of the data items counted (step 106 in FIG. 4 and procedure ii) in FIG. 3).

Between the gray scale levels $U_{95}$ and $U_{05}$ (middle tone brightness range), a gray scale level of 80% from the large gray scale side, i.e., from the gray scale level $U_{95}$ is determined and set as $U_{20}$ (step 108, procedure iii) in FIG. 3). It should be noted that the selection of the gray scale or brightness level position $U_{20}$ is based on the gray scale levels, not on the number of the data items. In other words, $U_{20}$ is selected by the following expression;

$$(U_{95}-U_{20})/(U_{95}-U_{05})=80/100.$$

Then a peak between the gray scale levels $U_{05}$ and $U_{20}$ is discriminated (step 110, procedure iv) in FIG. 3). This peak, which is peak $P_1$, corresponds to the brightness of the background of the document.

Finally, the number of the data is counted from the gray scale level at peak $P_1$ toward the large gray scale side (the high brightness side) to doscriminate the gray scale level L at which the resultant count value is equal to $S \times (1200/8000) = S \times 3/20$ is determined. Thus obtained gray scale level L is set as a lowermost brightness value L (step. 112, procedure v) in FIG. 3). The location at which the number of data count is around 3/20=15%, within which a gray scale level corresponding to the background of the document usually ranges, was obtained in advance and determined to be a preferable value by experimentation.

The percentages 5% and 80%, and coefficients such as 3/20 which are used in the series of procedures i) through v) varies in dependence on various conditions, such as film types and characteristics of the line sensor, and are preferably determined by experimentation.

After the matrix computation section 60 has discriminated the uppermost and lowermost brightness values U and L as the above-described, its matrix converter 60c calculates the element $A_{pq}$ of the matrix M by using the expression below:

$$A_{pq}=a_{pq}(U-L)/148+L;$$

and the result is stored in the memory 46 (step 114). In the expression, $a_{pq}$ denotes an element of a reference threshold matrix which is, for example, an 8×8 Bayer type matrix. The constant 1/148 in the expression is also determined by preliminary experimentation and the constant is not limited to this value. It is recognized, however, that the middle tone density range appropriate for binary conversion when using a Bayer type matrix covers about 148 gray scale levels. When the difference (U-L) between the uppermost and lowermost brightness values U and L is changed from 148 gray scale levels, the ratio of the change, (U-L)/148, is used to expand or compress the distribution of the individual elements $A_{pq}$ of the Bayer type matrix. When the film is negative film, the middle tone densities are usually distributed within a comparatively narrow range to result in (U-L)<148. Therefore, the distribution of the individual elements $a_{pq}$ of the Bayer type matrix is compressed and corresponds to the narrow middle tone density range of the negative film. Since the lowermost brightness value L of the middle tone image brightness range is added to the respective elements $a_{pq}$ of the matrix, only image signals higher than this lowermost brightness value L can be accurately converted into binary values.

Then, when all the pixel data of the projected image are obtained by the main scan, the binarizer 2 reads the threshold matrix M stored in the memory 46 and converts the pixel data into binary values. In this way, and without deterioration of the image quality, binary conversion can be performed within a narrow density range in which a middle tone image, such as a photograph or a picture, is included.

In the histogram for the positive film, as shown in FIG. 5, a peak $P_4$ appears in the large gray scale side (which corresponds to the light or white background of the document before exposure; and which corresponds to light areas in a positive film). A peak $P_5$ appears in the small gray scale side (which corresponds to smudges on the document and noise; and which corresponds to dark areas in the positive film). A brightness range corresponding to a middle tone image appears between the peaks $P_4$ and $P_5$.

First, the pro-scan is conducted (step 100), and the brightness histogram for sampling pixels is prepared (step 102). Then, $U_{95}$ is determined to be the gray scale level at which the count value obtained by counting the number of the data from the large gray scale side reaches 5% of the total data number S (step 104A in FIG. 6, procedure i) in FIG. 5). $U_{05}$ is determined to be the gray scale level at which the count value obtained by counting the number of the data from the small gray scale side reaches 5% of the total data number S, and to be set as the lowermost brightness value L of the middle tone image brightness range (step 106A, procedure ii) in FIG. 5).

Between the gray scale levels $U_{95}$ and $U_{05}$ (the middle tone brightness range), a gray scale level of 30% offset from the gray scale level $U_{95}$ side is determined and set as (step 108A, procedure iii) in FIG. 5). Then, a peak $P_1$, which is positioned between the gray scale levels $U_{95}$ and $U_{70}$, is discriminated (step 110A, procedure iv) in FIG. 5). The number of data is then counted from peak $P_4$ toward the small gray scale side, and a gray scale level at which the count value reaches S×3/20 is determined to be an uppermost brightness value U (step 112A, procedure v) in FIG. 5). The elements $A_{pq}$ of the threshold matrix M are calculated using the same befores-mentioned expression:

$$A_{pq}=a_{pq}(U-L)/148+L,$$

and the results are stored in the memory (step 114). The coefficients that are used in the series of procedures i) through v) are determined also in dependence on the types of film involved and the documents that are to be exposed.

The binarizer 2 employs the obtained converted threshold matrix M to binarize all pixel image signal data for the entire projected image which are obtained by the main scanning. With this procedure, the binary conversion can be performed, without deterioration of image quality, within the narrow density range in which a middle tone image such as a photograph or a picture is included.

In the above description, the procedures for determining the uppermost and lowermost brightness values U and L are changed in compliance with whether the film to be read is positive film or negative film. However, these procedures need be determined only in consonance with which microfilm is being employed, and the present invention is not limited to the procedures that are employed in this embodiment. The range defined by the uppermost and lowermost brightness values U and L is considered to be a brightness range in which a middle tone image such as a photograph is included. In the present invention a method other than the above described embodiment may be applied to determine the middle tone image brightness range and to calculate its uppermost and lowermost brightness values U and L. Further, the expression for calculating the element $A_{pq}$, which involves the use of the uppermost and lowermost brightness values U and L, is not limited to that used in the embodiment.

In this embodiment, pixel data, i.e., image signals, obtained during the pre-scanning are used for the preparation of a histogram and the conversion of a threshold matrix, and then the main scan is performed to enable the binarization of a full image. The image processing method of the present invention, however, can be performed by a single scanning operation. More specifically, when data for all the pixels of a projected image are obtained during a single main scanning, the data are stored in the memory 61 which is shown as an imaginary block in FIG. 2. Accorrding to this alternative embodiment, sampling is then performed on part of the data that is stored in the memory 61, and a histogram and a threshold matrix M are prepared by using sampling data. After the threshold matrix M has been prepared, the binarizer 2 reads data for all the pixels from the memory 61 and converts them into binary values. Of course, addresses (p, q) for respective pixels which are output from the address counters 62 and 64, or synchronisation signal b and c which are to be input to the respective counters 62 and 64, are also stored in the memory 61, and these address data are also employed by the binarizer 2 for binary conversion of the full image.

Figure 7:
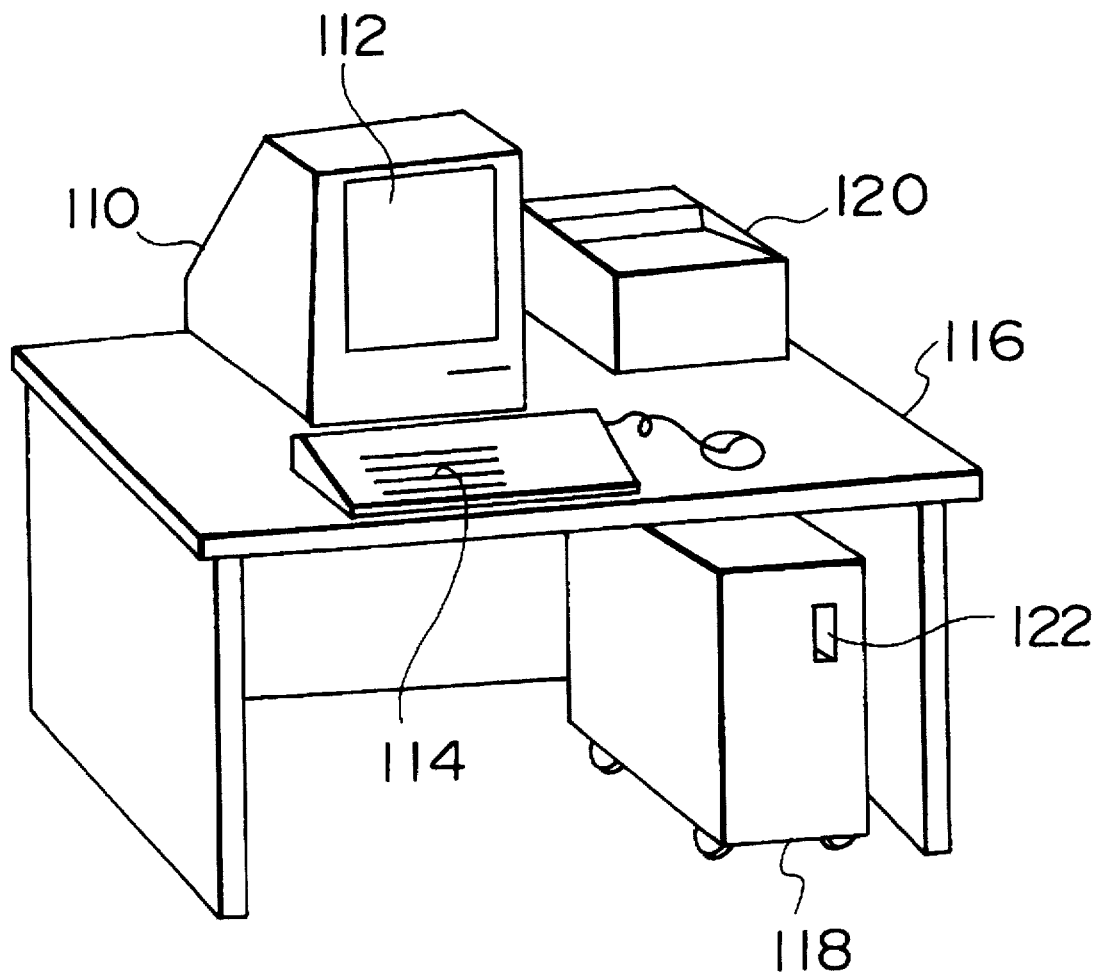
FIG. 7 is a diagram showing all the parts of an image reading apparatus that incorporates a second embodiment of the present invention.
Figure 8:
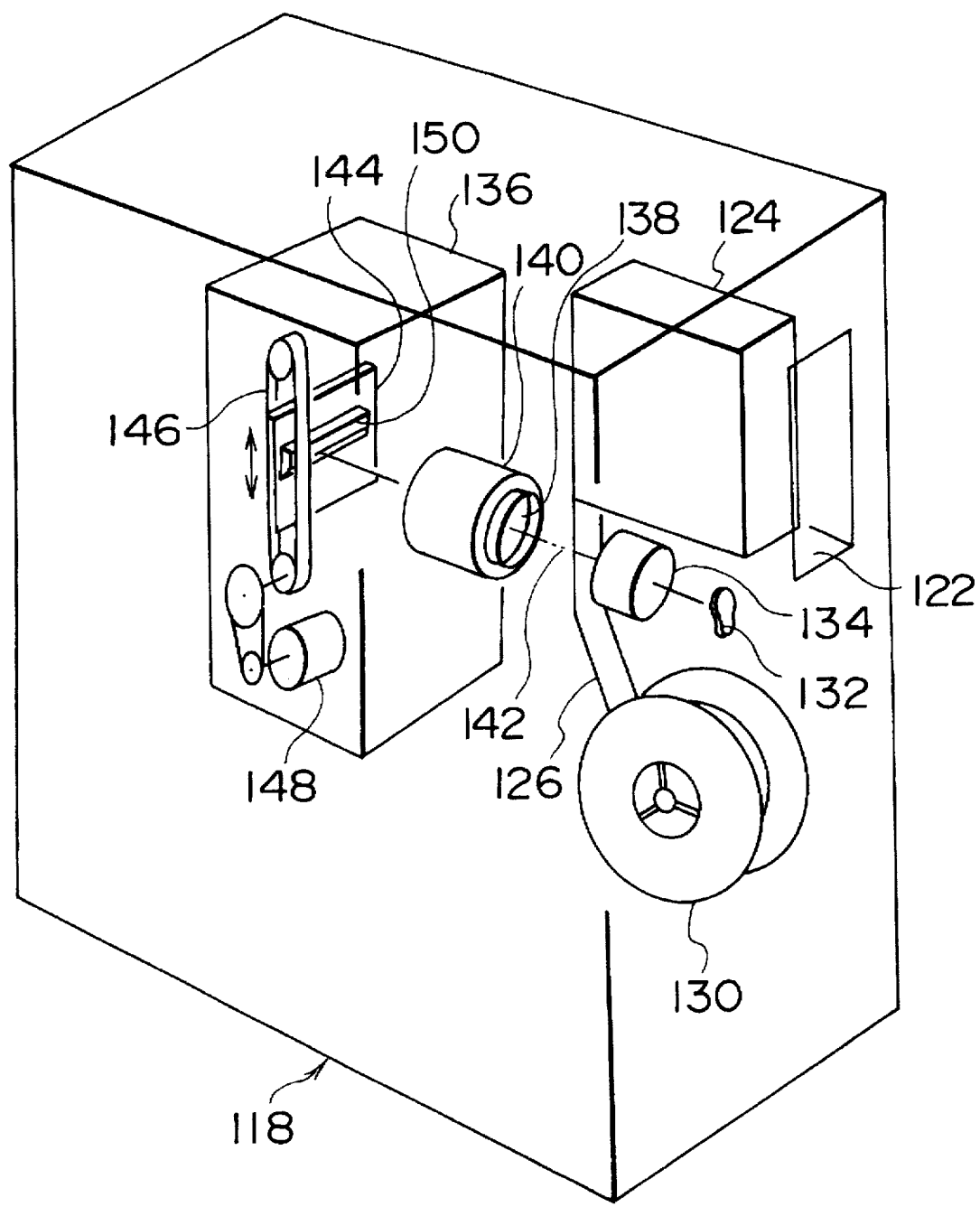
FIG. 8 is a perspective view illustrating the interior of the image reading apparatus in FIG. 7.
Figure 9:
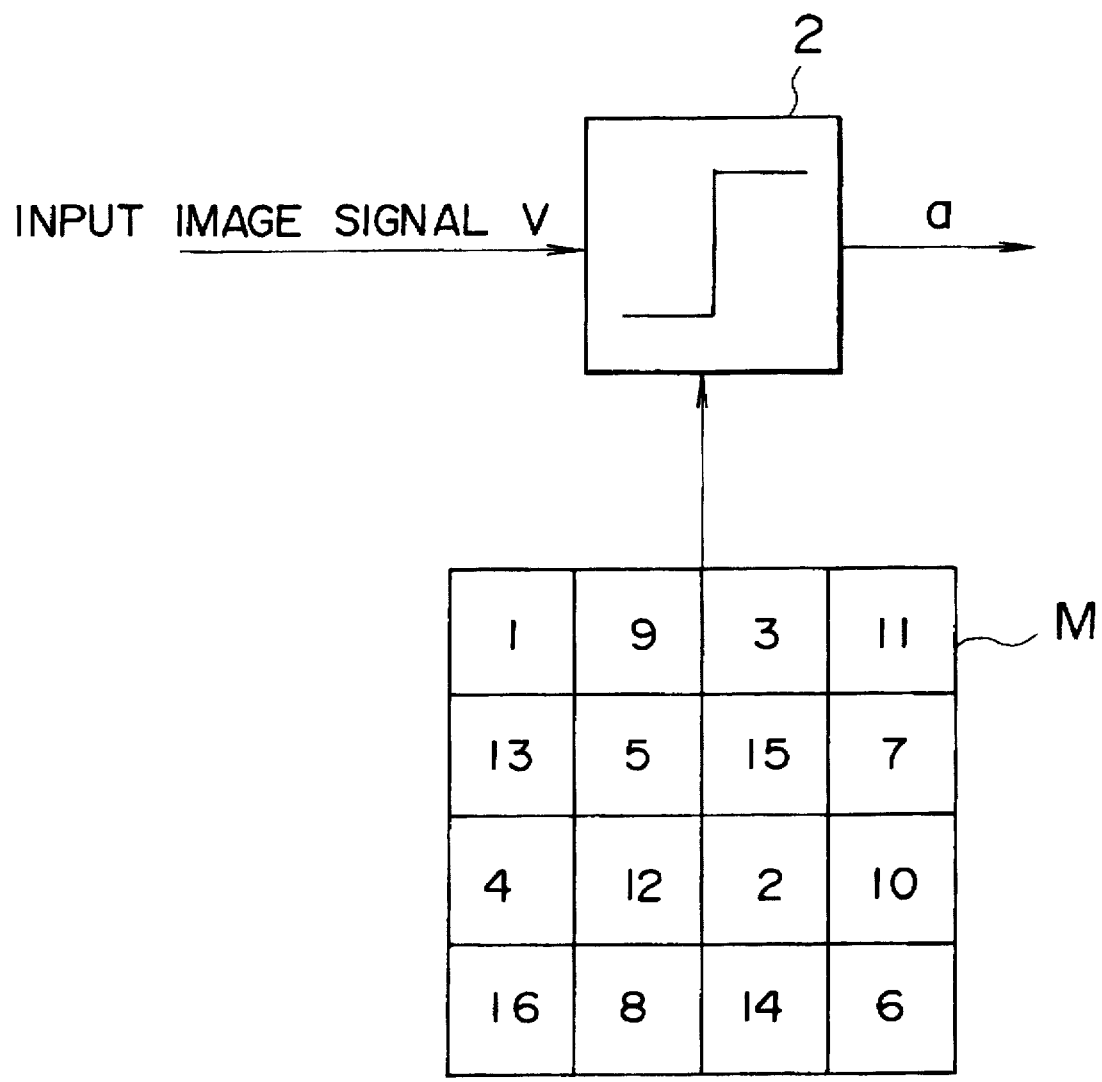

FIG. 7 is a diagram showing an image reading apparatus as used according to a second embodiment of the present invention; and FIG. 8 is a perspective view showing the interior of this image reading apparatus. In this embodiment, image processing is performed with a projected microfilm image so that the resultant binary image can be displayed in a CRT display device.

In FIG. 7, a computer body 110 incorporates a CPU, etc. A display device 112, such as a CRT, is housed in the computer body 110. A keyboard 114, together with the computer body 110, is mounted on a desk 116. A scanner 118 is stored under the desk 116, and a printer 120 is placed on the desk 116.

The scanner 118 has a cartridge insertion port 122 in the upper portion of its front face, and reads an image recorded on a microfilm 126 which is held a cartridge 124 (see FIG. 8), which is inserted into the cartridge insertion port 122. A predetermined image process is performed on the read-out image by the CPU in the computer body 110. The resultant image is displayed on the display device 112, is printed by the printer 120, and either stored on a photomagnetic disk or transferred to an external processor.

When the cartridge 124 is inserted through the cartridge insertion port 122, the scanner 118 extracts the head lead of the film 126 from the cartridge 124, and feeds it downward to a take-up reel 130.

When viewing the scanner 118 in FIG. 8, the film 126 is transported along the farthest side from an observer's position. A light source lamp 132 and a condenser lens 134 are positioned between the cartridge 124 and the take-up reel 130. Light from the light source lamp 132 passes through the condenser lens 134 and the film 126, and the transmitted light is then read by a line sensor unit 136.

The line sensor unit 136 will now be described. The sensor unit 136 is formed together with a projection lens 138. More specifically, a barrel 140, in which the projection lens 138 is held, is integrally formed with the frame of the sensor unit 136. The projection lens 138 mounted in the barrel 140 is a fixed focus lens with a magnification power of about 2. The barrel 140 is held rotatably in the frame of the scanner 118. Thus, the barrel 140 rotates along a light axis 142 which is perpendicular to the film 126. The barrel 140 and the sensor unit 136 are rotated together by a servo motor (not shown).

A movable plate 144 is provided to the rear end of the barrel 140 in the sensor unit 136 and can reciprocate vertically relative to the light axis 142. The movable plate 144 is moved by a belt 146 which is extended parallel to the direction of movement of the plate 144. A distance the belt 146 is fed is controlled by a servo motor 148, and the servo motor 148 rotates forward and backward to permit the movable plate to reciprocate along a plane that is vertical to the light axis 142.

A longitudinal CCD line sensor 150 which is fixed to the movable plate 144 extends perpendicularly to the direction of reciprocation for the movable plate 144. A preamplifier that amplifies the output of the line sensor 150 is also mounted on the movable plate 144. The position of the light reception face of the CCD line sensor 150 must correspond to that of the image focusing face of a projection lens 138 though which an image is projected.

The CPU incorporated in the computer body 110 has various functions. Search means, which is constituted by software, detects a target frame of the film 126 by using a search blip (not shown) that is provided in advance. That is, the output of a blip sensor (not shown), which is located in the vicinity of the travel path of the film 126, is counted, while the distance the film 126 is fed is controlled and a target film frame is determined.

When a target frame is located at a predetermined position within a projection range that includes the light axis 142, the CPU outputs an operating signal to activate the line sensor unit 136. More specifically, the motor 148 is actuated and horizontally shifts the line sensor 150 across the image focusing face to read a projected image. The light source lamp 132 is kept on during the scanning, and is turned off when the scanning is not performed.

At the first pre-scanning, black frame detection means, one of the functions of the CPU, detects a black frame region by using image signals read by scanning operation of the line sensor 150.

The black frame is a peripheral portion of a document, i.e., a portion that appears in the external area of a document image when printed. Various algorithms for detecting a black frame have been proposed. For example, when the scanning line runs from a black frame to a document image area, a predetermioned number or more continuous black pixels changes or turns to a series of continuous white pixels on the scanning line, so that a boundary between the black frame and the document can be detected.

After the black frame has been detected, the inclination of the image of a document is discriminated and is corrected by actuating a motor. As a result, the entire line sensor unit 136 is rotated, and the line sensor 150 is aligned in parallel to one side of a projected image.

Then, the CPU determines a predetermined number (e.g., 7000) of sampling points within the area surrounded by the black frame, i.e., in the image area of the document, and reads brightness data at each point. The data are read as brightness data that correspond to, for example, 256 gray scales. The CPU prepares a brightness histogram based on the data, and discriminates a middle tone image brightness range in the same manner as in the first embodiment. The uppermost and lowermost brightness values U and L in this range are used for binary conversion as previously described.

As described above, according to the present invention, a brightness range (middle tone image brightness range) including a middle tone image is discriminated from a brightness histogram, and the uppermost and lowermost brightness values U and L in this brightness range are used to modify elements $a_{pq}$ of a reference threshold matrix (a so-called dithering matrix).

With this construction, a reference threshold value matrix for conventional binarization (a so-called dithering process) of the entire brightness range can be converted into a threshold matrix with which a desirable binarization can be performed on a narrow brightness range corresponding a middle tone image, with no deterioration of image quality. Areas other than those within the middle tone image brightness range tend to consist of blank, white spaces or black dots. This is convenient because these areas are those that originally define either background or characters, and once noise is removed, characters, etc. becomes blacked to be mich more clear.

The middle brightness range can be obtained by excluding predetermined ranges on the high and the low brightness sides in a histogram. Then a certain range, in which is a peak that corresponds to the background of a document, is removed from the middle brightness range to provide a middle tone image brightness range. The conversion of the threshold matrix that has 256 gray scales can be performed by using the following expression:

$$A_{pq}=a_{pq}(U-L)/148+L$$

Although the reference threshold matrix $a_{pq}$ employed here is preferably a Bayer type, the present invention is not limited to this. An image processed in the embodiments is a projected microfilm image that can be read by a CCD line sensor. However, not only a microfilm, but also film for printing, x-ray film for medical diagnostic use, and other types of films may be employed with the present invention. The brightness of the background, which is included in an image of a document that is recorded in a film, fluctuates greatly in response to exposure conditions and developing conditions. The present invention is especially effective in such a case. Further, an image may be read by an image sensor that is positioned close to a film.

What is claimed is:

1. An image processing method, for employing a threshold matrix to binarize image signals obtained by reading an image recorded on a film, comprising the steps of:
   a) preparing a histogram that represents the number of pixels in relation to an intensity or brightness level of said image signals;
   b) discriminating from the histogram a middle tone image brightness range corresponding a middle tone image;
   c) converting individual elements of a reference threshold matrix by using uppermost and lowermost brightness values of said middle tone image brightness range to obtain a converted threshold matrix; and
   d) binarizing said image signals by said converted threshold matrix,
   wherein at said step c), said individual elements of said reference threshold matrix are converted by an expression given below to obtain said converted threshold matrix;

$$A_{pq}=a_{pq}(U-L)/X+L$$

wherein
   $A_{pq}$: individual elements of said converted threshold matrix;
   $a_{pq}$: the individual elements of said reference threshold matrix;
   U: the uppermost brightness value of said middle tone image brightness range;
   L: the lowermost brightness value of said middle tone image brightness range; and
   X: a number that is greater than (U−L) and smaller than N, where N is a number representing an entire range of gray scale levels that is read for said image, when said film is a negative film, or a number that is greater than 1 and smaller than (U−L) when said film is a positive film.

2. The image processing method according to claim 1, wherein at the step b), a middle brightness range is calculated by excluding predetermined brightness ranges on a high and low brightness sides from said histogram, and a predetermined brightness range including a peak that corresponds to a background portion in the image is excluded from said middle brightness range so that said middle tone image brightness range is determined.

3. The image processing method according to claim 1, wherein said reference threshold matrix is a Bayer matrix.

4. The image processing method according to claim 1, further comprising a step of reading the gray scale levels of the image, wherein the read gray scale image comprises 256 tone levels, and wherein the value of X in said expression is 148.

5. The image processing method according to claim 4, wherein said reference threshold matrix is a Bayer matrix.

6. The image processing method according to claim 1, wherein said image signal is obtained by reading an image projected on a microfilm using a CCD line sensor.

7. The image processing method according to claim 1,
   wherein at said step a) said histogram is prepared by using image signal data of sampled pixels, said sampled pixels being sensed by a pre-scanning,
   and wherein at said step d), image signals for all pixels of the image are binarized by using said converted threshold matrix, said all pixcels being sensed by a main scanning to obtain the image signals for all pixels.

8. The image processing method according to claim 1,
   wherein at said step a), said histogram is prepared by using image signal data of sampled pixels of the image, said image signal data of sampled pixels being a part of all pixels of the image,
   and wherein at said step d), image signals for said all pixels are binarized by using said converted threshold matrix.

9. The image processing method according to claim 8, wherein said sampled pixels on which sampling is performed are those obtained by uniform sampling of all pixels in said image.

10. An image processing apparatus, which employs a threshold matrix to binarize image signals obtained by reading an image recorded on a film, comprising:

a) histogram preparation means for preparing a histogram that represents the number of pixels in relation to an intensity or brightness level of said image signals;

b) a discriminator for discriminating from the histogram a middle tone image brightness range including brightness levels corresponding to a middle tone image;

c) a matrix converter for converting individual elements of a reference threshold matrix by using uppermost and lowermost brightness values for said middle tone image brightness range to obtain a converted threshold matrix; and d) a binarizer for binarizing said image signals by said converted threshold matrix, wherein said matrix converter converts said individual elements of said threshold matrix by an expression given below to obtain said converted threshold matrix;

$$A_{pq} = a_{pq}(U-L)/X + L$$

wherein $A_{pq}$: individual elements of said converted threshold matrix;

$a_{pq}$: the individual elements of said reference threshold matrix;

U: the uppermost brightness value of said middle tone image brightness range;

L: the lowermost brightness value of said middle tone image brightness range; and X: a number that is greater than (U−L) and smaller than N, where N is a number representing an entire range of gray scale levels that is read for said image, when said film is a negative film, or a number that is greater than 1 and smaller than (U−L) when said film is a positive film.

11. The image processing apparatus of claim 10, wherein said discriminator calculates a middle brightness range that excepts predetermined brightness ranges on a high brightness side and a low brightness side from said histogram, and excludes a predetermined brightness range including a peak that corresponds to a background portion in the image from said middle brightness range to obtain said middle tone image brightness range.

12. The image processing apparatus of claim 10, wherein said reference threshold matrix is a Bayer matrix.

13. The image processing apparatus of claim 10, further comprising a step of reading the gray scale levels of the image, wherein the read gray scale for said image comprises 256 tone levels, and wherein the value of X in said expression is 148.

14. The image processing apparatus of claim 13, wherein said reference threshold matrix is a Bayer matrix.

15. The image processing apparatus of claim 10, wherein said histogram preparation means prepares said histogram for sampled pixels for which sampling is performed by a pre-scanning of said image, and wherein said binarizer binarizes image signals for all pixels by using said converted threshold matrix which is obtained based on said sampled pixels, the image signals for all pixels being obtained by a main scanning of said image.

16. The image processing apparatus of claim 10, wherein said histogram preparation means prepares said histogram for sampled pixels extracted by sampling from all pixels read from said image;

and wherein said binarizer binarizes image signals for said all pixels by using said converted threshold matrix obtained based on said sampled pixels.

17. The image processing apparatus of claim 16, further comprising a memory for storing image signals for said all pixels, wherein said histogram preparation means reads image signals of a part of said image signals stored in said memory as sampled data and prepared said histogram by using said sampled data; and wherein said binarizer binarizes said image signals of said all pixels, which are read from said memory, by using said converted threshold matrix obtained based on said sampled data.

* * * * *